No. 727,982. PATENTED MAY 12, 1903.
J. G. LUDWIG.
FLUID PRESSURE COUPLING FOR AIR BRAKE PIPES.
APPLICATION FILED FEB. 19, 1903.
NO MODEL.
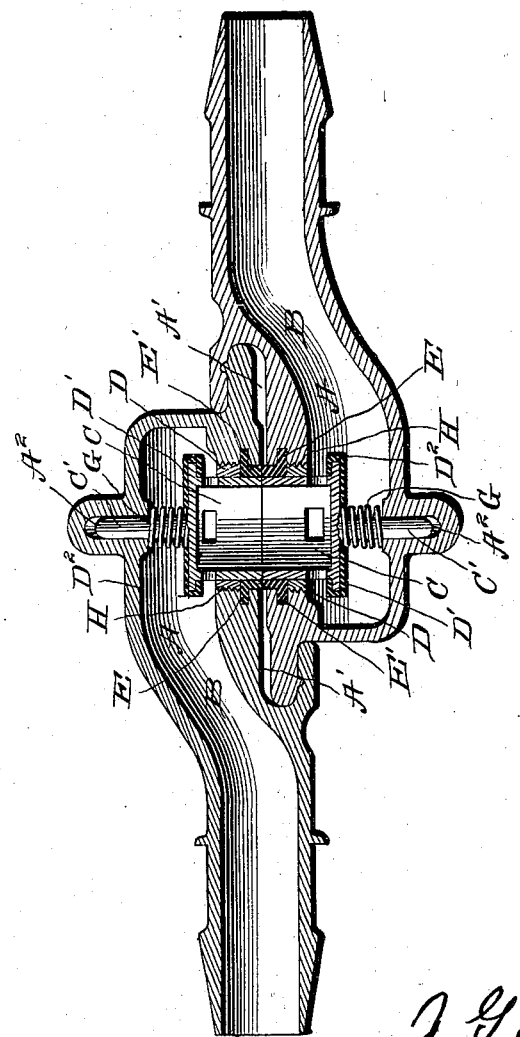
Witnesses
R. A. Boswell.
A. L. Hough.
Inventor
J. G. Ludwig,
By Franklin H. Hough
Attorney No. 727,982. Patented May 12, 1903.

UNITED STATES PATENT OFFICE.

JOHN G. LUDWIG, OF SPRAKERS, NEW YORK.

FLUID-PRESSURE COUPLING FOR AIR-BRAKE PIPES.

SPECIFICATION forming part of Letters Patent No. 727,982, dated May 12, 1903.

Application filed February 19, 1903. Serial No. 144,105. (No model.)

*To all whom it may concern:*

Be it known that I, JOHN G. LUDWIG, a citizen of the United States, residing at Sprakers, in the county of Montgomery and State of New York, have invented certain new and useful Improvements in Fluid-Pressure Couplings for Air-Brake Pipes; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to new and useful improvements in fluid-pressure couplings for air-brake pipes; and it consists in the provision of means whereby when cars equipped with my couplers are disconnected the exit-opening is automatically closed, rendering the pipe effective for applying brakes to the opposite end of the car.

My invention relates, further, to various details of construction and combinations and arrangements of parts, which will be hereinafter fully described and then specifically defined in the appended claim.

My invention is clearly illustrated in the accompanying drawing, which, with the letters of reference marked thereon, forms a part of this application, and in which drawing I have shown a longitudinal section through my improved coupler, showing the relative construction and arrangement of parts.

Reference now being had to the details of the drawing by letter, A designates the coupler, which may be of any approved construction and provided with an air-chamber B, which is adapted to be connected to the air-supply pipe. One side of the coupler is recessed, as at A', for the reception of the meeting end of a coupler, and seated in an annular recesss E', formed in the wall of an aperture leading through the coupler into the air-chamber, is a flanged collar E, made, preferably, of rubber or other suitable packing material. A portion of the wall of said aperture leading into the air-chamber is threaded, as at H, and adapted to receive a valve-collar D, forming a seat for the flange of a valve C, which latter is adapted to work through said aperture in the wall of the coupler. The flange D' of said valve has a rubber covering $D^2$, which is adapted to contact with the seat or collar D when at its farthest outward throw. As said collar D has threaded connection with the wall of the aperture in the coupler-head, it will be noted that the same may be adjusted and held in different positions, thus limiting the throw of said valve. The inner wall of the coupler-head is recessed, as at $A^2$, to receive the stem C' of the valve, which has a play and is guided therein. A spring G is interposed between the head of the valve and the wall of the coupler-head about said recessed portion $A^2$ and serves to normally seat the valve when the coupler is disconnected.

As the two couplers are similarly constructed, when interlocked the two valves will bear against each other, which will cause the latter to open sufficiently to allow the air to pass from one coupler-head to the other, thus making a continuous communication from the air-supply chamber to the cylinder, where the brake is applied, and in case the cars equipped with the couplers become detached the springs will throw the valves to their seats and prevent the escape of air.

While I have shown a particular construction of apparatus embodying the features of my invention, it is obvious that I may make alterations in the various parts of the device, if desired, without departing from the principle of the invention.

Having thus fully described my invention, what I claim as new, and desire to secure by Letters Patent, is—

A fluid-pressure coupler comprising the coupler-head having an air-chamber therein, a flanged flexible collar seated in an annular groove in an opening through the side wall of the coupler-head, a valve-collar having circumferential threads designed to engage threads about the circumference of said aperture in one side of the annular groove therein, a hollow valve having a flanged end adapted to seat against said threaded collar, a rubber covering about the flange of said valve, a stem integral with the valve and guided in 5 a slot in a projecting portion of the head, and a spring interposed between said valve and the wall of the head, as set forth.

In testimony whereof I hereunto affix my signature in presence of two witnesses.

JOHN G. LUDWIG.

Witnesses:
WILLIAM P. CASLER,
JOHN BAXTER.